United States Patent
Kawamura et al.

[11] Patent Number: 4,629,127
[45] Date of Patent: Dec. 16, 1986

[54] INTERMITTENT SWIRL TYPE INJECTION VALVE

[75] Inventors: Kiyomi Kawamura; Akinori Saito; Masatoshi Yamada; Kenji Imai; Masanobu Kimura, all of Aichi, Japan

[73] Assignee: Kabushiki Kaisha Toyota Chuo Kenkyusho, Aichi, Japan

[21] Appl. No.: 647,557

[22] Filed: Sep. 5, 1984

[30] Foreign Application Priority Data

Sep. 5, 1983 [JP] Japan ................... 58-163004

[51] Int. Cl.$^4$ .................. B05B 1/34; F02M 61/08
[52] U.S. Cl. ........................... 239/489; 239/533.12
[58] Field of Search ........ 239/584, 585, 533.3–533.12, 239/487, 489, 491, 474, 468, 452, 453, 488

[56] References Cited

U.S. PATENT DOCUMENTS

| | | | |
|---|---|---|---|
| 1,252,254 | 1/1918 | Fisher | 239/584 |
| 4,060,199 | 11/1977 | Brune et al. | 239/585 X |
| 4,179,069 | 12/1979 | Knapp et al. | 239/585 X |
| 4,365,746 | 12/1982 | Tanasawa et al. | 239/585 X |
| 4,526,143 | 7/1985 | Oshima et al. | 239/474 X |

FOREIGN PATENT DOCUMENTS 1197303  11/1959  France ........................ 239/533.12

Primary Examiner—Joseph F. Peters, Jr.
Assistant Examiner—Kevin Patrick Weldon
Attorney, Agent, or Firm—Sughrue, Mion, Zinn Macpeak & Seas

[57] ABSTRACT

An intermittent swirl type injection valve having a spray angle, capacity coefficient and fuel spray travel distance set so that the valve produces optimum engine operating conditions, with the spray angle, capacity coefficient and fuel spray travel distances being determined taking into account the gap area $A_c$, the spray hole diameter $d_e$, and the area $A_g$ of tangential passages in the valve. The injection valve includes a valve body and a valve needle slidably fitted in a valve hole formed in the valve body. A spray hole in the valve body merges with a valve seat provided at an end of the valve hole, and the spray hole is shaped to receive the lower end of the valve needle. Tangential passages swirl the fuel when the needle valve leaves the valve seat to open the valve to spray fuel substantially conically through the spray hole. The injection valve is designed so as to satisfy the following conditions:

$\alpha = 20°$ to $75°$, $d_e = 0.3$ to $1.2$ mm, and $$\frac{A_g \sin \theta}{(A_c + A_g \cos \theta)} \leq 5.66,$$

where $\alpha$ is the spray angle of the fuel and $\theta$ is the angle between the central axis of the tangential passages and the central axis of the valve needle.

7 Claims, 12 Drawing Figures

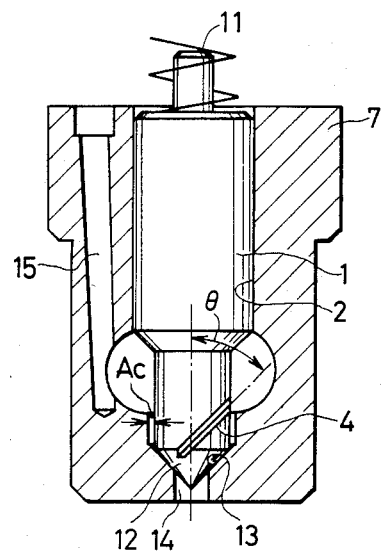 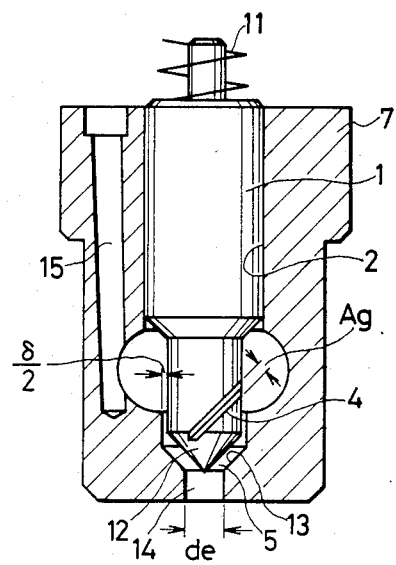

INTERMITTENT SWIRL TYPE INJECTION VALVE

BACKGROUND OF THE INVENTION

The present invention relates to an improved intermittent swirl type injection valve which is used for a fuel injection type internal combustion engine such as a diesel engine, and which swirls fuel with the aid of tangential passages and a swirl chamber so that the fuel is jetted substantially in conical form through a spray hole.

In a conventional intermittent swirl type injection valve of the same general type to which the invention pertains, a valve needle is slidably fitted in a valve hole formed in the valve body. There is unavoidably a certain gap between the wall of the valve hole and the cylindrical surface of the valve needle. In order to prevent leakage of pressurized fuel through the gap, heretofore, the gap has been formed by employing a design or manufacturing method in which the gap is made considerably small, typically 2 to 5 microns, or it is provided with a hydrodynamic arrangement. However, it is difficult to form a very small gap which is so small with a uniform accuracy.

Further, because the intermittent swirl type injection valve has a large spray angle, sometimes fuel droplets adhere to the wall of the combustion chamber or the intake manifold of the internal combustion engine. In order to overcome this adhesion, it is necessary to change the spray angle to a value suitable for the configuration or dimensions of the combustion chamber or intake manifold. However, the spray angle of the conventional intermittent swirl type injection valve cannot be readily changed to a desired value.

On the other hand, for the engine, it is required that the loss of energy in driving the injection pump be decreased, and, for a given quantity of injected fuel, the period of injection made as short as possible. Therefore, it is desirable to reduce the flow resistance in the spray hole or the fuel passage as much as possible, and accordingly it is not practical to reduce the diameter of the spray hole to an extremely small value.

The fuel is sprayed in the form of a cone having a cavity at the center. Foreign matter such as carbon particles may enter the spray hole through the cavity and clog the spray hole. Accordingly, it is necessary to prevent the entrance of foreign matter into the spray hole. However, it is practically impossible in the conventional intermittent swirl type injection valve to prevent the entrance of foreign matter into the spray hole.

In direct injection type internal combustion engines, the combustion chamber is formed by forming a recess in the top of the piston. Unlike an internal combustion engine with a swirl chamber and a precombustion chamber, this type of engine has no holes through which the chambers are communicated with the combustion chamber, resulting in a relatively low compression ratio. The direct injection type internal combustion engine is advantageous in that the engine has a smaller frictional loss and lower fuel consumption. Thus, such an engine has been extensively employed as a large engine.

On the other hand, a small engine having cylinders of a small diameter is disadvantageous in the formation of the mixture gas when compared with a large engine.

In a conventional direct injection type internal combustion engine, a fuel injection valve, directed substantially towards the center of the recess formed in the top of the piston, jets or sprays a plurality of spray streams radially from a plurality of spray holes. With this arrangement, an intake vortex formed by the intake valve and the intake passage during the intake operation of the engine is present even at the end of the compression stroke, and therefore mixture gas is formed while the fuel spray streams are being pulled in the swirling direction of the vortex in the recess. The diameter of the recess is generally 40 to 70% of the diameter of the piston or the cylinder. Accordingly, in a small engine in which the piston's diameter is 100 mm or smaller, the diameter of the recess is small, and hence the compression ratio cannot be significantly increased without decreasing the diameter of the recess. Thus, the engine suffers from the difficulty that the fuel spray streams jetted or sprayed radially from the spray holes of the fuel injection valve strike the inner wall of the recess, forming a film thereon or remaining as large droplets. As a result, the fuel is not effectively burned. In other words, the quantity of mixture gas available for combustion is decreased so that the engine output is decreased while the fuel consumption is increased. Moreover, the engine may smoke.

In order to eliminate these difficulties, it has been proposed to use a swirl type injection valve whose penetration force is sufficiently small that no fuel spray strikes the inner wall of the recess. However, in a swirl type injection valve fabricated according to a conventional design and manufacturing method, the spray angle is considerably large. Therefore, although the spray does not strike the wall of the combustion chamber, it has a tendency to stick to the top of the piston. In addition, the penetration force of the spray is extremely small, and therefore the fuel droplets may not move far in the combustion chamber.

Fuel droplets which stop moving in the combustion chamber are not burned because of being enveloped in combustion gas. Accordingly, it is necessary for the fuel droplets to have a momentum sufficiently large to move in the combustion chamber until they are burned. Therefore, the direct injection type internal combustion engine should use a swirl type injection valve whose spray angle is 75° or smaller. A design and method of manufacturing such a swirl type injection valve having such a small spray angle have not yet been realized.

SUMMARY OF THE INVENTION

In order to optimize the performance of the valve by appropriately forming the gap, the spray angle and the spray hole of the intermittent swirl type injection valve, the present inventors have conducted various experiments and analyses and have found that the dimensions of the gap greatly affect the spray angle and the capacity coefficient. Heretofore, the gap dimensions have been taken into account only with respect to the problem of preventing the leakage of fuel. However, the inventors have found that the gap is an essential factor affecting the overall performance of the swirl type injection valve. That is, in order to allow the swirl type injection valve to attain its optimum performance, for instance, with respect to the above-described spray angle, capacity coefficient and fuel spray travel, the inventors have established a manufacturing method in which the factors of the injection valve, such as the area $A_c$ of the gap, the diameter $d_e$ of the spray hole, and the area $A_g$ of the tangential passages are set at values which optimize the valve performance, thus providing an intermittent swirl type injection valve which is considerably improved in performance compared with a conventional injection valve.

In view of the foregoing, a primary object of the invention is to provide an intermittent swirl type injection valve which provides a desired spray angle, capacity coefficient and fuel spray travel distance by taking the gap area $A_c$, the spray hole diameter $d_e$, etc. into account, to thus provide such a valve which is adapted for the operating conditions of an internal combustion engine.

Another object of the invention is to provide an intermittent swirl type injection valve which is simple in construction, which can be readily manufactured and installed, which is highly and uniformly accurate, which provides excellent spraying characteristics and high performance with a small loss of pressure, and which prevents the entrance of foreign matter into the spray hole.

The foregoing objects and other objects of the invention have been achieved by the provision of an intermittent swirl type injection valve comprising a valve needle slidably fitted in a valve hole in a valve body, a spray hole merging with a valve seat provided at the end of the valve hole and being adapted to receive the lower end of the valve needle, and tangential passages for swirling fuel when the valve needle leaves the valve seat to open the injection valve to spray fuel substantially conically through the spray hole, and which, according to the invention, is designed so as to satisfy the following conditions:

$\alpha = 20°$ to $75°$, $d_e = 0.3$ to $1.2$ mm, and $$\frac{A_g \sin \theta}{(A_c + A_g \cos \theta)} \leq 5.66 \ (A_c > 0),$$

where $\alpha$ is the spray angle of fuel, $d_e$ is the diameter of the spray hole, $A_g$ is the area of the tangential passages, $A_c$ is the area of the gap provided between the wall of the valve hole and the cylindrical surface of the valve needle for supplying fuel therethrough, and $\theta$ is the angle between the central axis of each tangential passage and the central axis of the valve needle.

Furthermore, according to another aspect of the invention, with $d_e = 0.4$ to $1.0$ mm and $\alpha = 20°$ to $70°$, the intermittent swirl type injection valve satisfies the following conditions:

$$\frac{A_g \sin \theta}{A_c + A_g \cos \theta} \leq 5.66 \ (A_c > 0), \text{ for } 0.4 \text{ mm} \leq d_e \leq 0.9 \text{ mm},$$

and $$\frac{A_g \sin \theta}{A_c + A_g \cos \theta} \leq \frac{1}{d_e - 0.8} - 4.34 \ (A_c > 0),$$

for $0.9$ mm $\leq d_e \leq 1.0$ mm.
When $A_c = 0$, $$\frac{A_g \sin \theta}{A_c + A_g \cos \theta}$$

becomes a maximum and $\theta$ also becomes a maximum. If, in this connection, $\theta$ is 80° or larger, the number of tangential passages is increased, and accordingly the flow resistance is increased. In practice, it is difficult to manufacture an intermittent swirl type injection valve with $\theta > 80°$. Therefore, $\theta$ is preferably set to 80° ($\theta = 80°$). Accordingly, when $A_c = 0$, the value of $$\frac{A_g \sin \theta}{A_c + A_g \cos \theta}$$

is 5.66.

The intermittent swirl type injection valve according to the invention can be made to have desired values of the spraying angle, capacity coefficient and fuel spray travel distance by satisfying the above-described conditions, that is, by taking into account the spraying angle $\alpha$ of the fuel, the area $A_g$ of the tangential passages, the area $A_c$ of the gap provided between the wall of the valve hole and the outer wall of the needle valve for supplying fuel therethrough, and the angle $\theta$ between the central axis of each tangential passage and the central axis of the needle valve.

The inventors have conducted various experiments and analyses to determine the above-described limits by taking various factors of an intermittent swirl type injection valve used for an internal combustion engine into account.

Specifically, the spray angle ($\alpha \leq 75°$) suitable for a direct injection type diesel engine using the intermittent swirl type injection valve according to the invention is defined by four parameters, namely, the diameter $d_e$ of the spray hole, the area $A_g$ of the tangential passages, the area $A_c$ of the gap provided between the wall of the valve hole and the outer wall of the valve needle in the injection valve, and the fuel flow-in angle $\theta$ with respect to the swirl chamber.

BRIEF DESCRIPTION OF THE DRAWINGS

FIG. 11 is a vertical sectional view showing an intermittent swirl type injection valve constructed according to a second embodiment of the invention; and FIGS. 12 is a vertical sectional view showing the injection valve of FIG. 11 in the open state.

DESCRIPTION OF THE PREFERRED EMBODIMENTS

Figure 1:
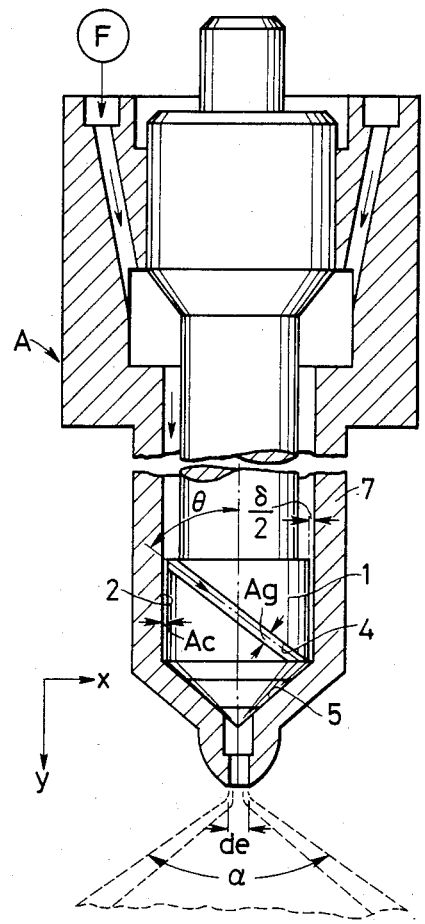
FIGS. 1 through 5 are diagrams showing in partial cross section an intermittent swirl type injection valve to which the technical concept of this invention is applicable.
Figure 2:
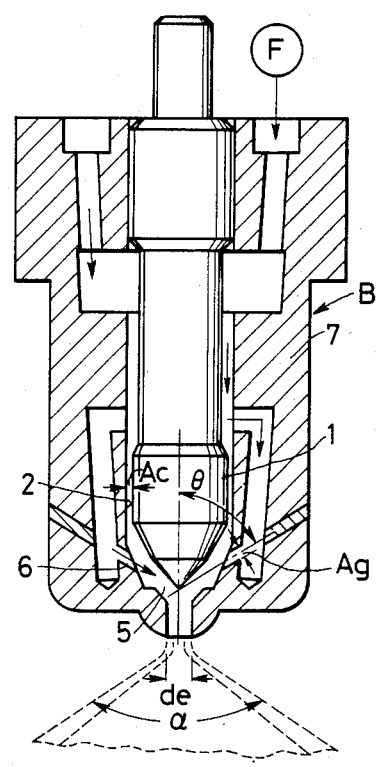
Figure 3:
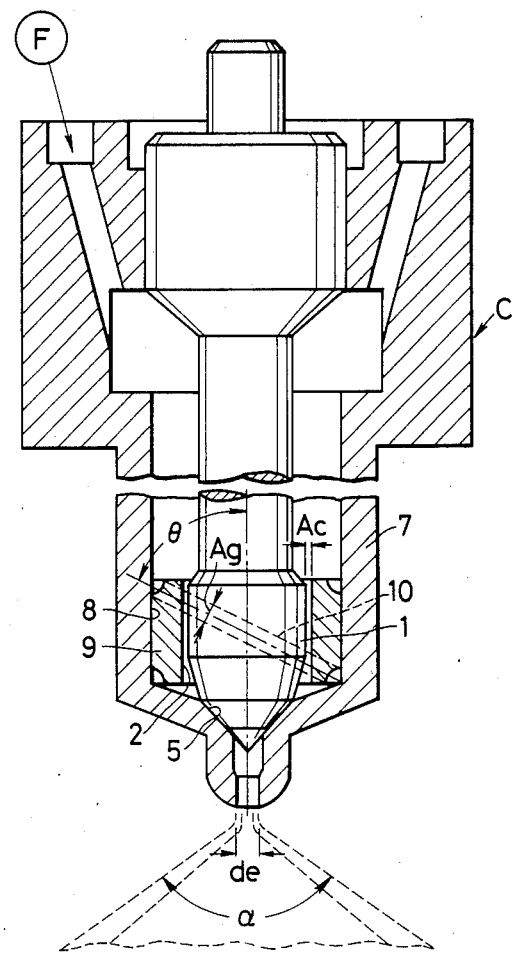

There are available three types of intermittent swirl type injection valves, A, B and C, respectively, shown in FIGS. 1, 2 and 3, in which the fuel is swirled. In the injection valve A of FIG. 1, tangential grooves 4 provide passages in the cylindrical surface of a valve needle 1. In the injection valve B of FIG. 2, tangential ports 6 communicate with the swirl chamber 5 of the valve. Finally, in the injection valve C of FIG. 3, tangential grooves 10 are formed in the outer wall of a partition member inserted between the inner wall 8 of the nozzle body 7 and the valve needle 1. In each of these injection valves A, B and C, in order to allow the valve needle 1 to slide, a gap δ should be provided between the wall of the valve hole 2 and the cylindrical surface of the valve needle 1 as shown in FIG. 1, 2 or 3. In the injection valve, fuel flows through the gap δ into the swirl chamber 5, that is, it flows in the direction Y, thus impeding the swirling of fuel in the swirl chamber 5 caused by the fuel passing through the tangential grooves 4 or 10 or the tangential ports 6. As a result, the spraying angle of the injection valve A, B or C is decreased.

Figure 4:
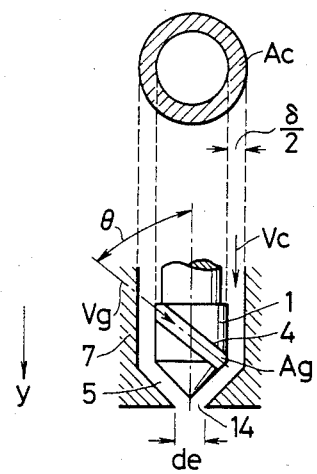
Figure 5:
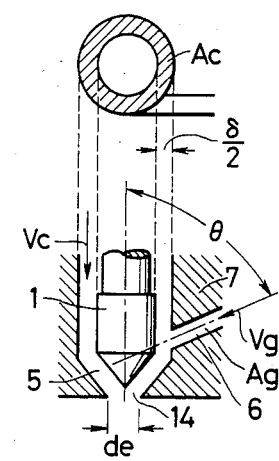

It is assumed that, as indicated in FIGS. 4 and 5, the velocity of fuel flowing through the gap δ is represented by $V_c$, the velocity of fuel flowing through the tangential grooves 4 or the tangential ports 6 of the swirl chamber 5 by $V_g$, the area of the tangential grooves 4 or the tangential ports 6 of the swirl chamber 5 by $A_g$, the area of the gap provided between the wall of the valve hole 2 and the cylindrical wall of the valve needle 1 in the injection valve by $A_c$ ($A_c>0$), and the fuel flow-in angle with respect to the swirl chamber 5 by $\theta$. Then, according to the motion of fluid, the amount of motion in the swirl direction is:

$$m \cdot V_r = \rho \cdot A_g \cdot V_g (V_g \sin \theta), \quad (1)$$

where $\rho$ is the density of the fuel.

The amount of motion in the direction of the Y axis is:

$$m \cdot V_y = \rho \cdot A_c \cdot V_c^2 + \rho \cdot A_g \cdot V_g (V_g \cos \theta). \quad (2)$$

Therefore, the ratio of (1) to (2) is:

$$\frac{m \cdot V_r}{m \cdot V_y} = \frac{\rho A_g V_g (V_g \sin \theta)}{\rho A_c V_c^2 + \rho A_g V_g (V_g \cos \theta)} \quad (3)$$

$$\frac{V_r}{V_y} = \frac{A_g V_g^2 \sin \theta}{A_c V_c^2 + A_g V_g^2 \cos \theta}.$$

The velocity $V_r$ is a swirl velocity component, and the velocity $V_y$ is a Y-axis velocity component. The velocities $V_r$ and $V_y$ affect the spray angle. More specifically, as the swirl velocity $V_r$ increases or the Y-axis velocity $V_y$ decreases, the spray angle is increased.

In general, $V_c = V_g$. Therefore, expression (3) can be rewritten as follows:

$$\frac{V_r}{V_y} = \frac{A_g \sin \theta}{A_c + A_g \cos \theta}. \quad (4)$$

Figure 6:
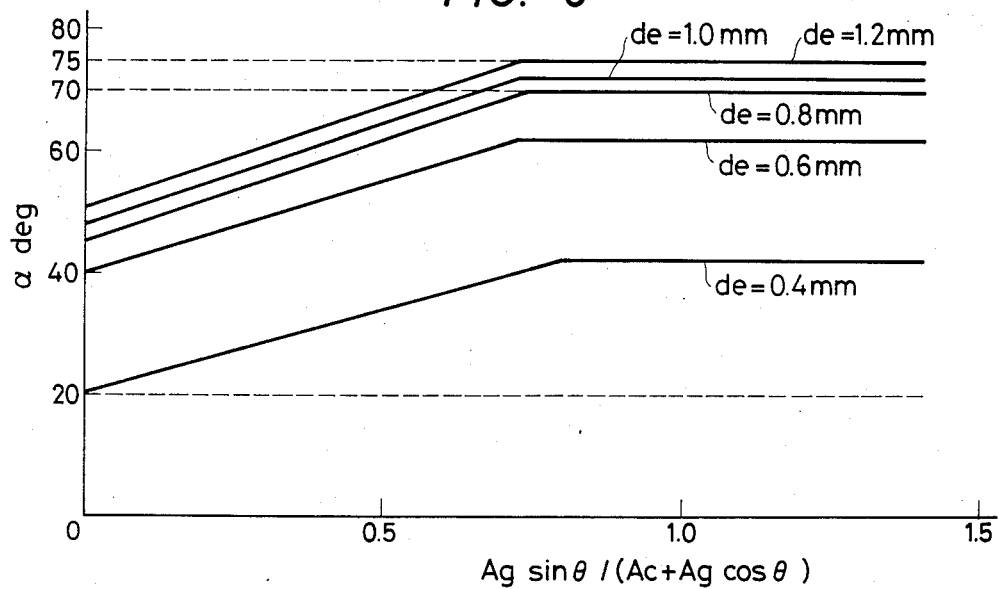
FIGS. 6 and 7 are graphical representations indicating factors most suitable for an intermittent swirl type injection valve according to the invention.

According to the results of various experiments and analyses, spray angles α and values of expression (4), $(A_g \sin \theta)/(A_c + A_g \cos \theta)$ can be as indicated in FIG. 6.

Figure 7:
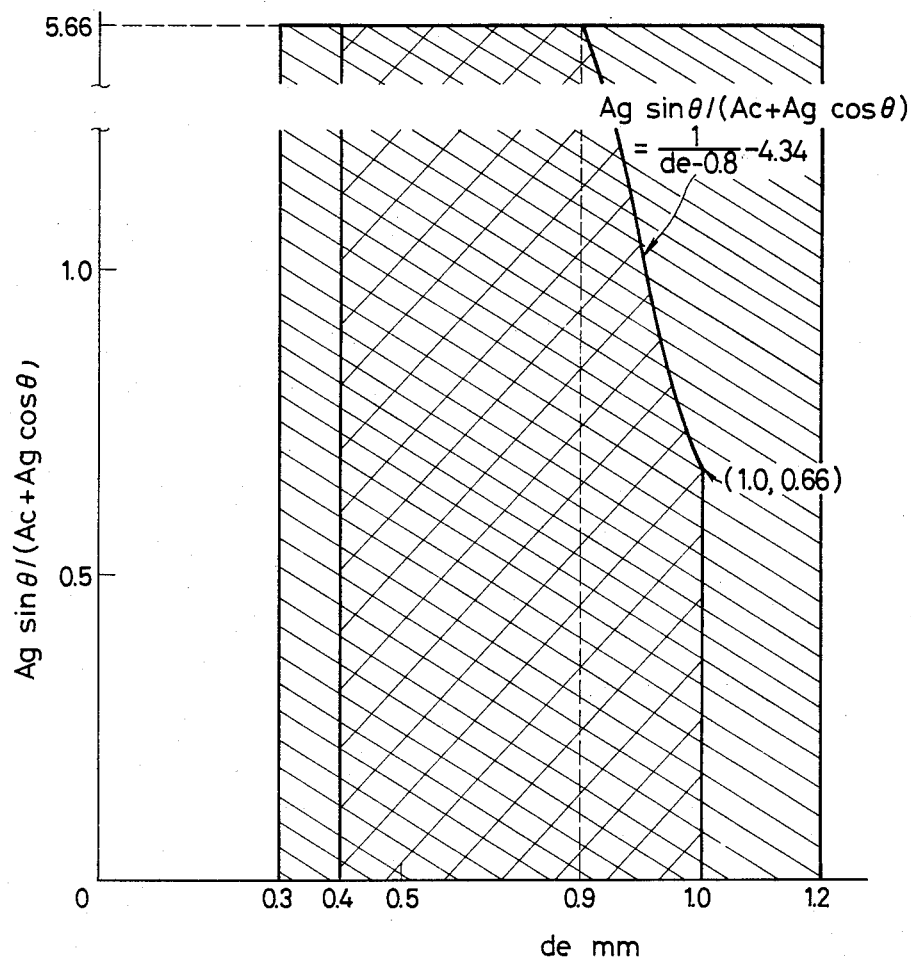

An injection valve having a spray angle α which is 75° or smaller suitable for a direct injection type diesel engine can be provided with injection valve factors in the ranges indicated by oblique lines in FIG. 7 which is based on FIG. 6 and comprising the above-mentioned four parameters.

If α is smaller than 20°, then the fuel spray will strike the wall of the combustion chamber, thus causing the difficulties of, for instance, the spray particles becoming nonuniform and large in size and the spray forming a liquid film on the wall. If α is larger than 75°, then the fuel spray tends to stick directly to the upper part of the piston or the edges of recesses or openings, thus causing the same difficulties.

Taking the seizure of carbon into account, the diameter of the spray hole is defined as follows:

$$0.3 \text{ mm} \leq d_e \leq 1.2 \text{ mm}.$$

If the diameter $d_e$ is smaller than 0.3 mm, then its passage resistance is high, and therefore the flow rate is insufficient, as a result of which the spraying period is increased to adversely affect combustion. On the other hand, if $d_e$ is larger than 1.2 mm, then the seizure of carbon is liable to increase.

Next, preferred embodiments of the invention will be described.

FIRST EMBODIMENT (FIGS. 8 THROUGH 10)

In an intermittent swirl type injection valve according to a first embodiment of the invention, a valve needle 1 is slidably fitted in a valve hole 2 formed in the lower end portion of a nozzle body 7, and a spiral spring 11 is provided on the base end face of the needle valve 1. The valve hole 2 merges with a conical valve seat 13 which is formed in the lower end of the nozzle body to receive the conical end 12 of the valve needle 1. The conical valve seat 13 merges with a spray hole 14 opening in the lower end face of the nozzle body 7. A cylindrical swirl chamber 5 is formed in the nozzle body 7 surrounding the boundary between the cylindrically shaped body of the valve needle 1 and the conical end 12 thereof. Supply passages 15 are formed in the lower end portion of the nozzle body 7, and connecting ports 6 are formed, as tangential passages along the connecting direction, in the cylindrical wall of the swirl chamber 5 in such a manner that the ports 6 extend from the ends of the supply passage 15 to the swirl chamber 5.

This injection valve is thus so designed that, when the pressure of the fuel in the swirl chamber, which is supplied thereinto through the supply passages 15, and the tangential ports 6 is increased, the valve needle 1 is lifted away from the seat 13 against the force of the spiral spring 11, as a result of which a gap is formed between the conical end 12 of the valve needle 1 and the seat 13, and accordingly the swirl chamber 5 is communicated through the gap with the spray hole 14 so that the injection valve is opened. Thus, the supply passages 15, the tangential ports 6, the swirl chamber 5 and the gap between the conical end 12 of the needle valve 1 and the conical seat 13 of the valve hole 2 form a passageway which supplies fuel into the spray hole 14 in a spiralling or swirling manner when the injection valve is opened.

Furthermore, the injection valve is designed so as to satisfy the following conditions:

$$\alpha = 20° \text{ to } 75°,$$

$$d_e = 0.3 \text{ to } 1.2 \text{ mm},$$

and $$\frac{A_g \sin \theta}{(A_c + A_g \cos \theta)} \leq 5.66 \ (A_c > 0),$$

where α is the spray angle of fuel, $d_e$ is the diameter of the spray hole 14, $A_g$ is the area of the tangential ports 6, $A_c$ is the area of the gap provided between the wall of the valve hole and the outer wall of the needle valve, and θ is the angle between the central axis of each tangential port 6 and the central axis of the valve needle 1.

The most suitable values of these factors are as follows:

$\alpha = 45°$, $d_e = 0.6$ mm, and $$\frac{A_g \sin \theta}{(A_c + A_g \cos \theta)} = 0.17 \ (A_c > 0).$$

The intermittent swirl type injection valve described above provides a suitable spray angle, which has been difficult for the conventional injection valve. As the intermittent swirl type injection valve can be readily machined as required, the spray angle can be readily changed to a desired value. Furthermore, in the injection valve of the invention, the entrance of foreign matter into the spray hole is prevented.

SECOND EMBODIMENT (FIGS. 11 AND 12)

Figure 8:
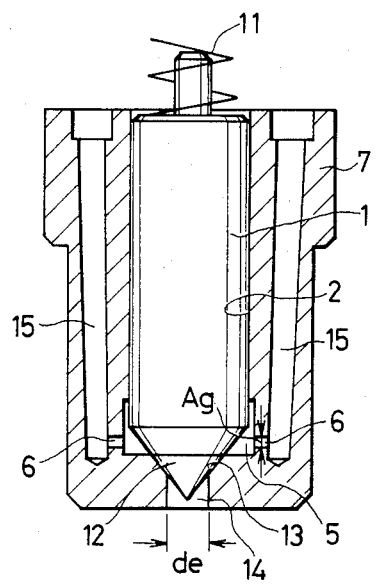
FIGS. 8, 9 and 10 are sectional views of an intermittent swirl type injection valve constructed according to a first embodiment of the invention.
Figure 9:
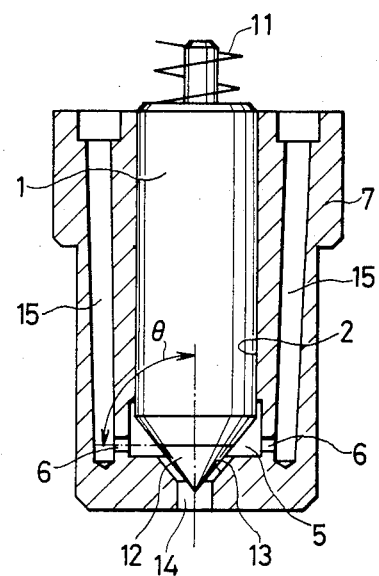
Figure 10:
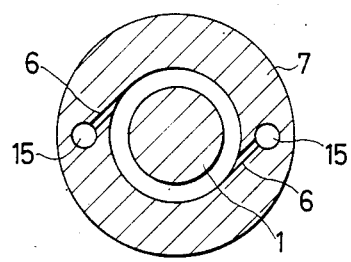

While the first embodiment described above is of the port type in which the tangential passages formed in the nozzle body 7 are used to swirl the fuel which is supplied to the spray hole 14, the second embodiment of the invention is of the screw type in which tangential grooves 4 formed in the valve needle 1 are used to swirl the fuel expelled through the spray hole 14. The second embodiment is equal or substantially equal to the first embodiment in the other points. In FIGS. 11 and 12, those components which have been previously described with reference to FIGS. 8 and 9 are therefore designated by the same reference numerals or characters.

The intermittent swirl type injection valve of the second embodiment of the invention is designed so as to satisfy the following conditions:

$d_e = 0.4$ to $1.0$ mm, and $\alpha = 20°$ to $70°$.

More specifically, $$\frac{A_g \sin \theta}{A_c + A_g \cos \theta} \leq 5.66 \ (A_c > 0), \text{ for } 0.4 \text{ mm} \leq d_e \leq 0.9 \text{ mm},$$

and $$\frac{A_g \sin \theta}{A_c + A_g \cos \theta} \leq \frac{1}{d_e - 0.8} - 4.34 \ (A_c > 0),$$

for $0.9 \text{ mm} < d_e \leq 1.0$ mm.

Representative ranges are as follows:

$\alpha = 40$ to $50°$, and $$\frac{A_g \sin \theta}{A_c + A_g \cos \theta} = \frac{1}{28}\left(\alpha + \frac{5.4}{d_e^2} - 55\right) \ (A_c > 0),$$

in addition to the above range, $$\frac{A_g \sin \theta}{A_c + A_g \cos \theta} \geq 0.72 \ (A_c > 0), \text{ for } 0.4 \leq d_e \leq 0.46.$$

The effects of the second embodiment are substantially the same as those of the first embodiment.

We claim:

1. An intermittent swirl type injection valve comprising: a valve body; a valve needle slidably fitted in a valve hole in said valve body; a spray hole in said valve body merging with a valve seat provided at an end of said valve hole, said spray hole being shaped to receive a lower end of said valve needle; and tangential passages provided for swirling fuel when said valve needle leaves said valve seat to open said injection valve to spray fuel substantially conically through said spray hole, wherein said injection valve satisfied the following conditions:

$\alpha = 20°$ to $75°$, $d_e = 0.3$ to $1.2$ mm, and $$\frac{A_g \sin \theta}{(A_c + A_g \cos \theta)} \leq 5.66 \ (A_c > 0),$$

where $\alpha$ is the spray angle of fuel, $d_e$ is the diameter of said spray hole, $A_g$ is the area of the tangential passages, $A_c$ is the area of a gap provided between a wall of said valve hole and a cylindrical surface of said valve needle for supplying fuel therethrough, and $\theta$ is the angle between a central axis of each tangential passage and a central axis of said valve needle.

2. The intermittent swirl type injection valve as claimed in claim 1, wherein said injection valve satisfies the following conditions:

$$\frac{A_g \sin \theta}{A_c + A_g \cos \theta} = 0.17 \ (A_c > 0),$$

for $\alpha = 45°$, and $d_e = 0.6$ mm.

3. The intermittent swirl type injection valve as claimed in claim 1, wherein for $d_e = 0.4$ to $1.0$ mm and $\alpha = 20°$ to $70°$, the following conditions are satisfied:

$$\frac{A_g \sin \theta}{A_c + A_g \cos \theta} \leq 5.66 \ (A_c > 0), \text{ for } 0.4 \text{ mm} \leq d_e \leq 0.9 \text{ mm},$$

and $$\frac{A_g \sin \theta}{A_c + A_g \cos \theta} \leq \frac{1}{d_e - 0.8} - 4.34 \ (A_c > 0),$$

for $0.9 \text{ mm} < d_e \leq 1.0$ mm.

4. The intermittent swirl type injection valve as claimed in claim 3, wherein, for $\alpha = 40°$ to $50°$, the following conditions are satisfied:

$$\frac{A_g \sin \theta}{A_c + A_g \cos \theta} = \frac{1}{28}\left(\alpha + \frac{5.4}{d_e^2} - 55\right) \ (A_c > 0),$$

and in addition to the above range, $$\frac{A_g \sin \theta}{A_c + A_g \cos \theta} \geqq 0.72 \, (A_c > 0), \text{ for } 0.4 \leqq d_e \leqq 0.46.$$

5. The intermittent swirl type injection valve as claimed in claim 1, wherein said tangential passages are provided in said valve body.

6. The intermittent swirl type injection valve as claimed in claim 1, wherein said tangential passages are provided in said valve needle.

7. The intermittent swirl type injection valve as claimed in claim 1, further comprising a partition member inserted between an inner wall of said valve body and said valve needle, said tangential passages being provided in said partition member.

* * * * *